United States Patent
Sauerwald et al.

(10) Patent No.: US 10,575,677 B2
(45) Date of Patent: Mar. 3, 2020

(54) METHOD FOR OPERATING A FOOD PROCESSOR DRIVEN BY AN ELECTRIC MOTOR

(71) Applicant: Vorwerk & Co. Interholding GmbH, Wuppertal (DE)

(72) Inventors: Andres Sauerwald, Bottrop (DE); Ramona Wehlig, Horgen (CH); Stefan Hilgers, Essen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 238 days.

(21) Appl. No.: 15/073,756

(22) Filed: Mar. 18, 2016

(65) Prior Publication Data
US 2016/0270592 A1    Sep. 22, 2016

(30) Foreign Application Priority Data

Mar. 19, 2015 (EP) .................. 15159778

(51) Int. Cl.
| | | |
|---|---|---|
| *A47J 36/32* | (2006.01) | |
| *A47J 27/00* | (2006.01) | |
| *A47J 43/07* | (2006.01) | |
| *A47J 43/04* | (2006.01) | |

(52) U.S. Cl.
CPC ............. *A47J 36/32* (2013.01); *A47J 27/004* (2013.01); *A47J 36/321* (2018.08); *A47J 43/04* (2013.01); *A47J 43/0716* (2013.01)

(58) Field of Classification Search
CPC ........ A47J 36/32; A47J 43/0716; A47J 43/04; A47J 27/004
See application file for complete search history.

(56) References Cited

U.S. PATENT DOCUMENTS

| 4,649,810 A | * | 3/1987 | Wong ...................... | A47J 27/14 222/501 |
|---|---|---|---|---|
| 5,380,086 A | * | 1/1995 | Dickson .................. | A21C 1/14 241/101.2 |
| 5,819,636 A | * | 10/1998 | Khashoggi .............. | A47J 27/14 366/146 |
| 2002/0009016 A1 | * | 1/2002 | Ancona ................... | A47J 27/62 366/205 |
| 2005/0068846 A1 | * | 3/2005 | Wulf ...................... | A47J 43/046 366/199 |

(Continued)

FOREIGN PATENT DOCUMENTS

| DE | 20 2014 004 271 U1 | 7/2014 |
|---|---|---|
| EP | 2 574 261 A2 | 4/2013 |

(Continued)

*Primary Examiner* — Steven N Leff
(74) *Attorney, Agent, or Firm* — Collard & Roe, P.C.

(57) ABSTRACT

A method for operating a food processor driven by an electric motor for preparing a preparation item based on a recipe prepares the preparation item in a vessel of the food processor in one or more sequential preparation steps, in particular via mixing and/or heating and/or comminuting. In order to further support the user of the food processor during the preparation process, an operating parameter of the food processor is automatically controlled as a function of a repeated, similar behavior of the user while selecting or executing a recipe and/or of a presence of a user in the area of the food processor.

10 Claims, 3 Drawing Sheets

(56) References Cited

U.S. PATENT DOCUMENTS

| | | | | |
|---|---|---|---|---|
| 2006/0044935 A1* | 3/2006 | Benelli | ............... | A47J 27/004 366/145 |
| 2006/0263501 A1* | 11/2006 | Oghafua | ............... | A47J 27/004 426/523 |
| 2009/0037288 A1* | 2/2009 | Christensen | ............ | G06F 16/00 705/26.8 |
| 2009/0152258 A1* | 6/2009 | Schandel | ............... | A47J 27/004 219/385 |
| 2009/0258331 A1* | 10/2009 | Do | ...................... | G09B 21/003 434/127 |
| 2009/0326687 A1* | 12/2009 | McCoy | ..................... | G06F 8/10 700/90 |
| 2012/0320761 A1* | 12/2012 | Taylor | ..................... | H04L 12/10 370/242 |
| 2013/0222406 A1* | 8/2013 | Wolfe | ................... | G06T 11/206 345/582 |
| 2014/0345474 A1 | 11/2014 | Trench Rocha et al. | | |
| 2015/0305566 A1 | 10/2015 | Koetz | | |
| 2015/0305567 A1 | 10/2015 | Koetz | | |

FOREIGN PATENT DOCUMENTS

| | | | | |
|---|---|---|---|---|
| FR | 2 804 519 A1 | 8/2001 | | |
| GB | 2435434 A | * | 8/2007 | ............ A47J 43/044 |
| WO | 2014/083022 A1 | 6/2014 | | |
| WO | 2014/083029 A1 | 6/2014 | | |

\* cited by examiner

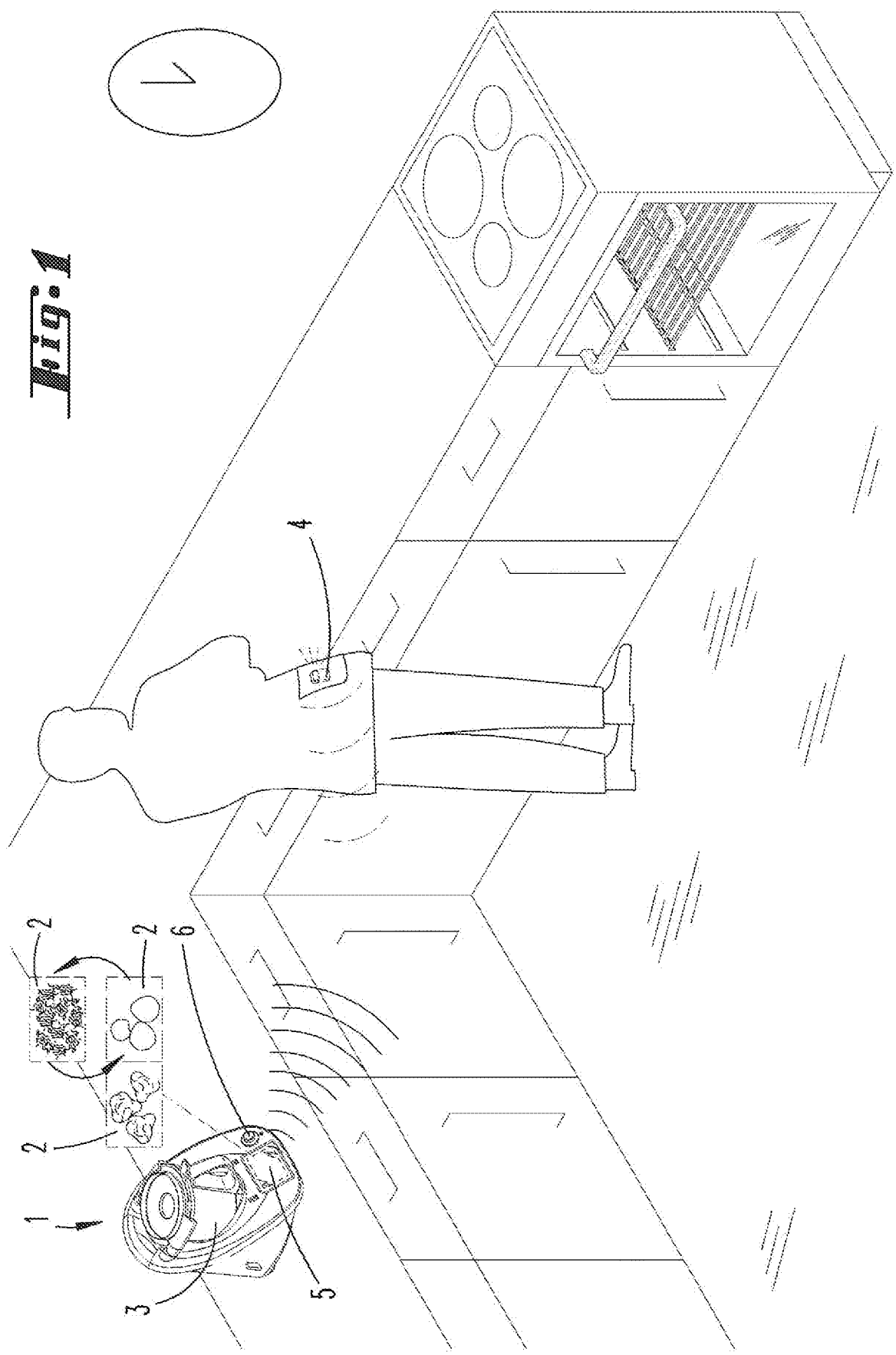

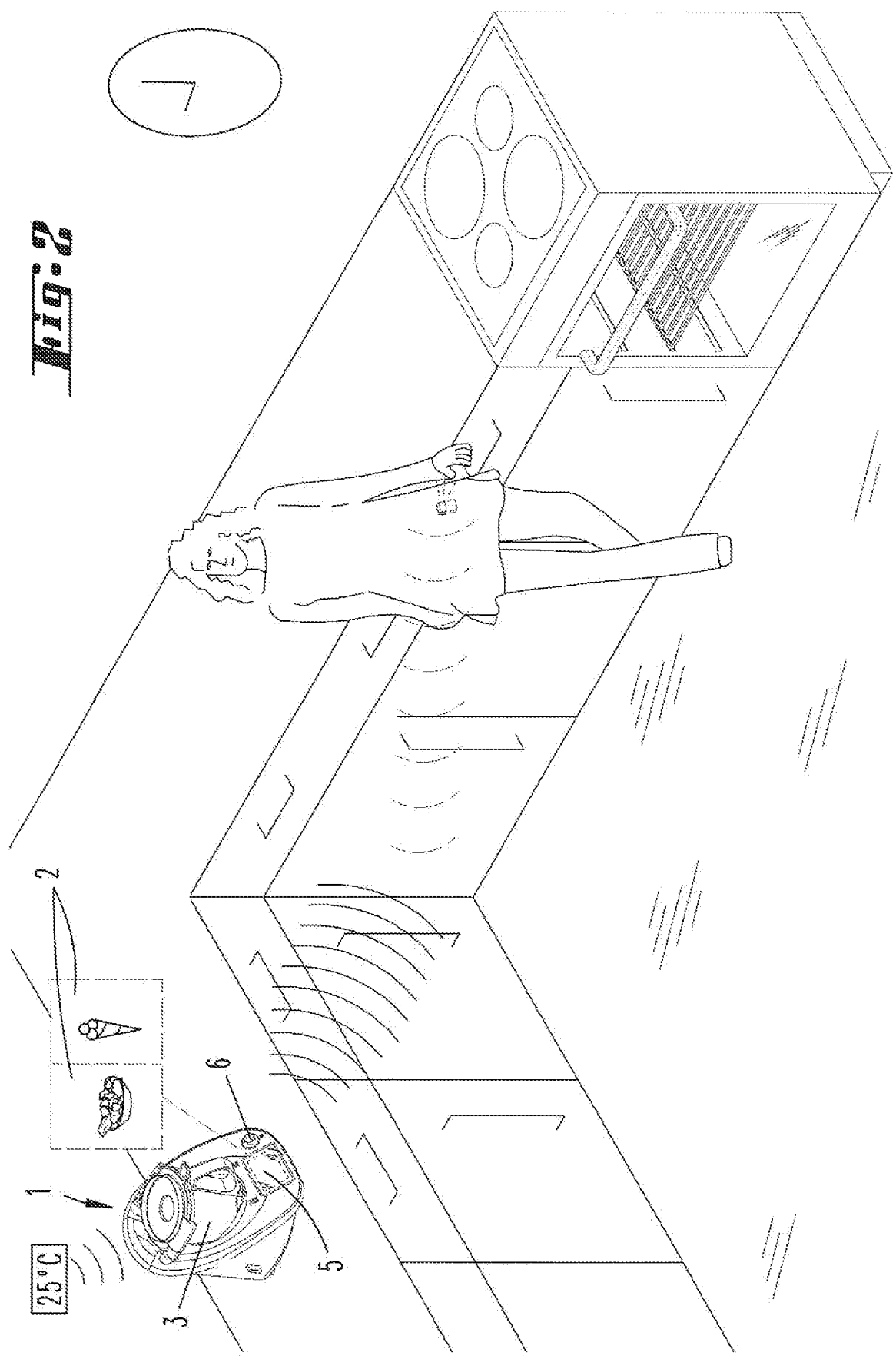

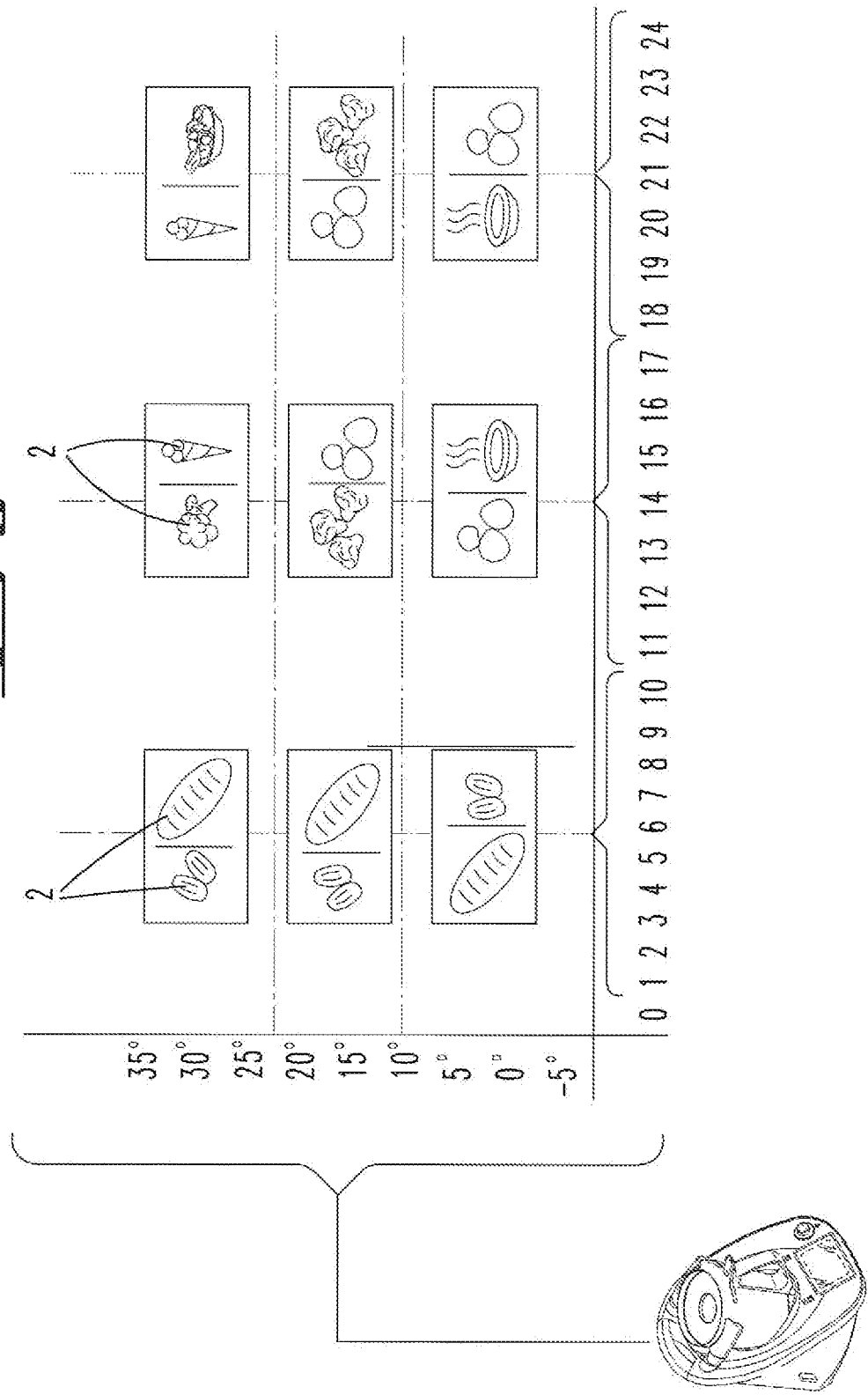

METHOD FOR OPERATING A FOOD PROCESSOR DRIVEN BY AN ELECTRIC MOTOR

CROSS REFERENCE TO RELATED APPLICATIONS

Applicant claims priority under 35 U.S.C. § 119 of European Application No. 15139778.8 filed Mar. 19, 2015, the disclosure of which is incorporated by reference.

BACKGROUND OF THE INVENTION

1. Field of the Invention

The invention relates to a method for operating a food processor driven by an electric motor for preparing a preparation item based on a recipe, wherein the preparation item is prepared in a vessel of the food processor in one or more sequential preparation steps, in particular via mixing and/or heating and/or comminuting.

Within the meaning of the invention, food processors driven by an electric motor include all semiautomatic or fully automatic food processors, such as cooking blenders and liquidizers, with which a user can advantageously perform several preparation steps for a recipe. These food processors most often have at least one vessel, to which a heater and mixer are allocated, so that a preparation item present in the vessel can be heated and/or mixed. In addition, it can also be provided that the preparation item be comminuted, kneaded or the like.

2. Description of the Related Art

In prior art, it is further known that the person using the food processor selects a recipe from a database containing a plurality of available recipes. The user can here chose based on his or her personal taste preferences, for example vegetarian recipes, low-fat recipes or the like.

SUMMARY OF THE INVENTION

Proceeding from this prior art, it is desirable to further improve the support provided to the user of a food processor while preparing a preparation item. In particular, it is desired that the behavior of the food processor be individually adjusted to the user and his or her personal preferences.

Therefore, in order to further develop the method for operating a food processor driven by an electric motor, it is proposed that an operating parameter of the food processor be automatically controlled as a function of a repeated, identical behavior of the user while selecting or executing a recipe and/or of a presence of a user in the area of the food processor.

The invention provides that the operation of a food processor, in particular the operating parameters of the food processor, be automatically controlled as a function of a personal user behavior of a user. To this end, the behavior of the user of the food processor is preferably stored in the memory of the food processor, or alternatively also in a central server of a network, and evaluated with respect to a recurring pattern of behavior. For example, the user behavior can involve a chronologically repeating selection and execution of one recipe from a plurality of recipes, so that a personal profile of the user can be created in the food processor or network. This personal profile is then accessed to control operating parameters of the food processor so as to satisfy the wishes of the user to a special degree. Furthermore, the presence of a user in the area of the food processor can alternatively or additionally be drawn upon as an environmental parameter with which to control the operation of the food processor. For example, the food processor can communicate directly with the user when the latter is present, while this is not possible if the user is not present.

In addition, the operating parameters of the food processor can also be controlled as a function of environmental parameters while executing the recipe. In this sense, the operation of the food processor can be controlled not just as a function of the personal behavior of the user and/or the presence of the user, but rather also as a function of objective environmental conditions in proximity to the food processor, such as ambient temperature, pressure, atmospheric humidity and the like. The ambient temperature is here of interest in particular during the preparation of a temperature-sensitive preparation item. For example, this preparation item can be yeast, cream or the like. A temperature sensor of the food processor or also an external temperature sensor that has a communications link with the food processor can measure a temperature in the immediate environment of the food processor and control an operating parameter of the food processor in such a way that the preparation item can be prepared. For example, the controlled operating parameter of the food processor can be a current temperature of the heater of the food processor.

It is proposed that the user behavior involve a personal selection or avoidance of a group of recipes based on ingredients specifically provided for the latter, a switching of ingredients provided for a recipe for other ingredients and/or a quantity of an ingredient deviating from the recipe. The food processor here records the user behavior based on the personal recipe selection or recipe avoidance, repeated deviations from recipe instructions, favorite lists, or a personal, basic ingredient substitution, for example, replacing conventional household sugar with honey. For example, a personal recipe selection can be a preferred selection of vegetarian meals, low-fat meals or the like. Recipe avoidance can involve a basic avoidance of meat-containing recipes, or also an avoidance of recipes with allergenic ingredients, such as apples, nuts, milk or the like. Based on the storage and evaluation of recipes previously selected by a user, the food processor here recognizes recurring ingredients or ingredients never used during preparation, and draws conclusions as to specific preferences or dislikes of the user. In addition, the evaluator of the food processor can also detect a recurring replacement of specific ingredients with other ingredients, and make a corresponding notation in the user profile to the effect that a specific ingredient is always to be replaced by another ingredient. If the user then selects a recipe with the undesired ingredient, the recipe is automatically changed so as to replace this ingredient according to the stored user profile. In addition, the user profile can also indicate that a certain ingredient only be used in a quantity lower than specified in the recipe while preparing the preparation item. For example, the food processor determines that a specific user always uses less fat or oil during preparation than called, for by the recipe. This user behavior is stored in the user profile, and taken into account during respective later preparations by reducing the quantity of fat specified in the recipe by a certain amount, for example by a specific percentage. As a consequence, the method according to the invention can be used to create a complex, individual user profile that is stored inside the food processor or also a central data memory of a network. This user profile serves to automatically adjust recipes to reflect the individual preferences of the user, so that the user no longer has to actively pay attention to a corresponding change in the recipe and take action during preparation, with the measures required for this purpose instead being automatically implemented by the food processor.

In addition, it is proposed that the user behavior involve a weekday used for executing a recipe, a time and/or hour used for executing a recipe, the incorporation of a recipe into a menu and/or a repeated frequency of using the food processor or the execution of a specific recipe or specific group of recipes. A recipe selection initiated by the user of the food processor is stored by the food processor and assigned to a specific weekday, time and/or hour. In this way, for example, the user profile can be enhanced to include information about preferred meals on specific days and at specific times and/or hours. For example, the user profile can contain information about the fact that the user normally prepares a warm meal in the evening hours during the Monday to Friday workdays, while he or she prefers the warm meal at noon on weekends. This makes it possible to suggest other recipes for the user to prepare on corresponding weekdays, for example cold meals or warm meals. In addition, there are also meals that can be consumed either cold or warm. One conceivable possibility here would be cold or warm rice pudding, for example. If the user behavior allows the conclusion that one of the variants is preferred at specific times, this can be recorded in the user profile and automatically considered for subsequent preparations. In terms of the invention, a repeated, similar user behavior can also involve a specific user not just preparing individual meals, but rather integrating the latter into a complete menu, so that the food processor might consider a simultaneous execution of several recipes or offer the user menu suggestions. Furthermore, a repetition frequency of food processor utilization can be derived from the user behavior and stored, so that, at the appropriate times when food processor utilization is to be expected based on the preparation history, the food processor is switched to a standby mode, a heater is preheated, or the like.

It is proposed that the operating parameter controlled as a function of a repeated, similar user behavior be a maintenance interval of the food processor. After an evaluation has been performed on the operating hours of the food processor, if necessary sorted by type of preparation, the stored data can be used to recognize in particular the technical demand placed on the food processor, and corresponding maintenance intervals can be projected. For example, if the user behavior reveals that the user of the food processor often runs the mixer at very high speeds, a correspondingly earlier maintenance interval can foe provided for the mixer. As a consequence, the user profile also provides information about how the functional efficiency of the food processor can be optimally ensured.

It can further be provided that the controlled operating parameter of the food processor be a speed of the mixer of the food processor and/or a temperature of a heater of the food processor. The mixer speed or heater temperature operating parameters can here advantageously be controlled as a function of the presence of a user in the nearby environment of the food processor, for example in the same room. The mixer speed as a controlled operating parameter may depend on whether the user of the food processor is present in proximity to the food processor to accompany the preparation and potentially take manual action to ensure a safe and optimal preparation of the preparation item. During the preparation of preparation items that react sensitively to changes in the ambient temperature, it may also be necessary to control the heater of the food processor in such a way that the fluctuating ambient temperature does not influence the successful outcome of the preparation process.

In particular, it can be provided that the controlled operating parameter involve a safety mode and/or a normal mode for the food processor. The safety mode can here be provided for a case where the user is not present in proximity to the food processor. The normal mode of the food processor can be provided for a case where the user is present. For example, the safety mode differs from the normal mode in that at higher speed of the mixer is possible. It can happen, for example, that, the food processor starts to excessively vibrate at high speeds given an uneven weight distribution of the vessel. If the food processor has detected beforehand by way of a sensor that the user is near the food processor, only a warning tone can be sounded to alert the user to the danger, while a safety mode is provided when the user is not present so as to either turn off the food processor or operate the mixer at a lower speed that does not cause the food processor to excessively vibrate. For example, the presence of the user in the area of the food processor can be determined by means of an optical sensor, a camera, a temperature sensor or a motion sensor.

In this sense, it is proposed that the safety mode encompass a reduction in a speed of a mixer used when executing a recipe or in a temperature of a heater of the food processor by comparison to the normal mode, or shutting down the mixer or heater of the food processor. The choice between the safety mode and normal, mode can be controlled as a function of the presence of a user in the area of the food processor, wherein the food processor is operated in the normal mode if the user is present, and wherein the food processor is operated in the safety mode when the user is not present.

Finally, it can be provided that the food processor only be operated in the safety mode if the user has not acted on the food processor within a specific timeframe, wherein a message about the impending operation of the food processor in the safety mode is sent out on a data communication device of the user. Therefore, if the user of the food processor is not present in the vicinity of the food processor, the user is informed by a message on a data communication device, for example a mobile phone, that the food processor will be turned off shortly or the mixer of the food processor will be operated at a speed less than called for by the recipe unless the user acts on the food processor within a specific, disclosed timeframe. For example, this action can involve the user redistributing the preparation item contained in the vessel, reducing the fill quantity, or the like.

Finally, the invention also relates to a food processor driven by an electric motor for preparing a preparation item based on a recipe, in particular for preparing according to one of the methods of the invention described above, wherein the food processor exhibits a heatable vessel designed to accommodate a mixer, and is designed to automatically control an operating parameter by means of an evaluator and controller as a function of a repeated, similar user behavior stored in a data memory during the selection or execution of a recipe and/or as a function of the presence of a user in the area of the food processor detected by a sensor. As a consequence, the food processor according to the invention exhibits a data memory or a data connection with an external data memory, in which the user behavior is stored. The user behavior here encompasses a plurality of data, such as a personal selection or avoidance of a group of recipes based on specific ingredients provided for the latter, a replacement of ingredients provided for a recipe with other ingredients, a quantity of ingredient deviating from the recipe, a weekday used for executing the recipe, a time and/or hour used for executing a recipe, the integration of a recipe into a menu and/or a repetition frequency with respect to the use of the food processor or the execution of a specific recipe or a specific group of recipes. These data are used to record a table inside the data memory, which the food processor can access during subsequent preparation. In addition, the food processor exhibits a sensor for detecting the presence of a user. For example, this sensor can be an optical or acoustic sensor, whose detection range covers the nearby environment of the food processor, in particular the room in which the food processor is standing. An evaluator and controller of the food processor evaluates this plurality of data stored in the table, and in the process recognizes repetitions of user behavior, and controls the current operating parameters of the food processor analogously to the operating parameters of the earlier preparations. Otherwise, the statements made with regard to the method according to the invention apply.

BRIEF DESCRIPTION OF THE DRAWINGS

The invention will be explained in greater detail below based on an exemplary embodiment. Shown on:
FIG. 1 is a method according to the invention as a function of a user behavior of a first user;
FIG. 2 is a method according to the invention as a function of a user behavior of a second user;
FIG. 3 is a stored user profile based on the previous user behavior of the user.

DETAILED DESCRIPTION OF PREFERRED EMBODIMENTS

FIG. 1 shows a first kitchen situation, in which a user of a food processor 1 is preparing a preparation item 2 that exhibits several ingredients.

The food processor 1 exhibits a vessel 3 along with a heater allocated to the vessel 3. In addition, the food processor 1 exhibits a mixer whose end region designed as a blade set is arranged inside of the vessel 3. In addition, the food processor 1 exhibits a conventional display 5 for selection menu display or command entry by the user. A switch 6 is further provided for turning the food processor 1 on and off. The user has a data communication device 4, here a mobile phone, which has a communications link with the food processor 1.

The invention now functions in such a way that the user of the food processor 1 selects a recipe in the data memory of the food processor 1, which he or she wishes to use to prepare a preparation item 2. To this end, he or she uses the display 5 to select a recipe front a database. The food processor 1 displays the selected recipe with the ingredients contained therein on the display 5. According to the recipe, the ingredients of the preparation item 2 contain potatoes and cauliflower, for example. The user now modifies this recipe in such a way as to use rice instead of potatoes. Otherwise, the recipe as recorded in the data memory of the food processor 1 is to remain intact. During the preparation of the preparation item 2, the food processor 1 alters the operating parameters so as to be suitable for the preparation of rice. To this end, the heater and mixer of the food processor 1 are controlled in such a way as to optimally boil the rice that replaced the potatoes.

If the user now repeatedly switches the potatoes for rice in this or even other recipes, an evaluator and controller of the food processor 1 recognizes that the user essentially wants to replace the potatoes with rice. This is recorded in the data memory of the food processor 1, so that the operating parameters of the food processor 1, i.e., here the mixer speed and heater temperature, for example, are controlled while executing the recipe in such a way as to successfully prepare the modified preparation item 2. If necessary, consideration can also be given to the fact that the user repeatedly wishes to use a specific quantity of rice for a recipe in the same way. To this end, a weighing mechanism of the food processor 1 can measure the quantity of rice that the user puts into the vessel 3. This quantity is recorded in the data memory of the food processor 1, so that this quantity of rice is taken into account during future preparations.

In addition, the food processor 1 stores the hour and weekday used for executing a recipe. In the example shown, the food processor 1 stores the fact that the user executes the corresponding recipe on a Saturday at 2 p.m. If the user activates the switch 6 or display 5 of the food processor 1 later on, for example in the following week, on a Saturday at 2 p.m., or around noon, the food processor 1 retrieves the current hour, and checks the data recorded in the data memory for this hour and potentially this user, i.e., recipes which the user executed on the very same weekday at around this hour.

To allow the food processor 1 to recognize the user, he or she carries a data communication device 4, here a mobile phone. The food processor 1 has a radio module that sends out electromagnetic waves, to the data communication device 4. The data communication device 4 receives this signal and sends out a response signal, which contains information about the person of the user. The food processor 1 receives this response signal, and accesses those recipes within its data memory that were already executed once by this user. For example, in the exemplary embodiment shown, the data memory of the food processor 1 can contain a separate table for each user of the food processor 1, which contains the recipes executed by the user in the past, sorted by weekday, hour of day or even the current outside temperature. If it is a hot day in summer, for example, the food processor 1 suggests different recipes to the user than for a cold winter day.

FIG. 2 shows a situation in which a user of the food processor 1 wishes to execute a recipe on a very hot summer evening, at around 9 p.m. The user carries a data communication device 4, which identifies her to the food processor 1. As soon as the user turns on the food processor 1 or gets into the radio range of the food processor 1, the food processor 1 recognizes the presence of the user based on her data communication device 4. The food processor 1 checks an internal calendar for the current hour and weekday, and queries a current outside temperature, e.g., via a network connection. To this end, for example, the food processor 1 can be connected with a temperature sensor via communications technology, or access a database containing current temperatures for the region.

As shown on FIG. 3, the data memory of the food processor 1 contains a table, which was generated based on the previous user behavior of the user. Recipes executed by the user under similar conditions were derived from the repeated, similar user behavior for specific outside temperatures and times of day, and stored. For the current outside temperature of 25° and current hour of 9 p.m., the user profile (table) contains the notation that the user wishes to prepare a salad along with ice cream as dessert. The food processor 1 thereupon retrieves corresponding recipes for salad or ice cream from the recipe database, puts them on the display 5 and, if necessary, prompts the user to select and/or confirm a corresponding recipe. The preparation of the preparation item 2 is then initiated.

In addition, the operation of the food processor 1 is also controlled as a function of whether the user is currently in proximity to the food processor 1. Data communication with the data communication device 4 of the user allows the food processor 1 to recognize whether he or she is in close proximity to the food processor 1, and can manually intervene in the preparation of the preparation item 2. If he or she is not present, in the area of the food processor 1, the food processor 1 can be operated in a safety mode, which only permits a specific maximum speed of the mixer of the food processor 1 or a maximum temperature of the food processor 1. In critical situations, for example when a vessel 3 unevenly loaded with preparation items 2 causes the food processor 1 to start vibrating, a deactivation of the mixer can be provided. In this case, the user can receive a message on his or her data communication device 4 indicating that the food processor 1 will now be operated in a safety mode and/or be turned off. Alternatively, it is also possible for the food processor 1 to wait for a specific period of time before switching to a safety mode, during which the user can act on the food processor 1, for example after having received a message about the impending safety mode on his or her data communication device 4. In the alternative case that the user is present in proximity to the food processor 1, an acoustic signal, for example a beep, can indicate that a manual intervention is necessary.

Finally, a maintenance interval suitable for optimally keeping the food processor 1 ready for use can be calculated based on how often the food processor 1 is used by the user.

REFERENCE LIST

1 Food processor
2 Preparation item
3 Vessel
4 Data communication device
5 Display
6 Switch

What is claimed is:

1. A method for operating a food processor driven by an electric motor for preparing a preparation item based on a recipe, the method comprising steps of:
    receiving, by a data communication device of the food processor, information about a user,
    evaluating, via an evaluator and controller of the food processor, behavior of the user when the user uses the food processor and selects and/or executes a recipe, wherein the behavior of the user involves repeated deviations from recipe instructions,
    storing in a data memory of the food processor a personal profile of the user based on the behavior of the user, the data memory containing a table for each of multiple users of the food processor,
    evaluating, by the evaluator and controller of the food processor, the behavior of the user stored in the table by recognizing repetitions of the user behavior,
    subsequently receiving, by the data communication device of the food processor, information about a person,
    controlling by the evaluator and controller a current operating parameter of the food processor analogously to the operating parameters of the earlier preparations,
    preparing the preparation item in a vessel of the food processor in one or more sequential preparation steps, and
    when the food processor recognizes the person as the user from the personal profile, automatically controlling an operation of the food processor via the evaluator and controller, the operation including at least one of the following three operations:
        heating the vessel,
        rotating a stirrer, or
        maintaining the food processor,
    wherein the automatic controlling via the evaluator and controller comprises controlling an operating parameter of at least one of the three operations of the food processor as a function of the personal profile stored in the data memory, and
    wherein the user behavior involves a switching of ingredients provided for a recipe for other ingredients and/or a quantity of an ingredient deviating from the recipe.

2. The method according to claim 1, wherein the user behavior further involves a weekday used for executing a recipe, a time and/or hour used for executing a recipe, the incorporation of a recipe into a menu and/or a repeated frequency of using the food processor or the execution of a specific recipe or specific group of recipes.

3. The method according to claim 1, wherein the controlled operating parameter is a maintenance interval of the food processor.

4. The method according to claim 1, wherein the controlled parameter is a speed of a stirrer of the food processor and/or a temperature of a heater of the food processor.

5. The method according to claim 1, wherein the controlled parameter comprises a safety mode and/or a normal mode for the food processor.

6. The method according to claim 5, wherein the safety mode comprises
    a reduction in a speed of a stirrer used when executing a recipe or in a temperature of a heater of the food processor by comparison to a normal mode, or
    shutting down a stirrer or a heater of the food processor.

7. The method according to claim 5, wherein the controlled parameter is controlled as a function of a presence of the person in an area of the food processor in that the food processor is operated in the normal mode if the data communication device receives information that the person is present and the food processor is operated in the safety mode if the data communication device receives information that the person is not present.

8. The method according to claim 5, wherein the food processor is only operated in the safety mode if the person has not acted on the food processor within a specific timeframe, and
    wherein the method further comprises a step of:
        sending out a message to a data communication device of the person about an impending operation of the food processor in the safety mode.

9. The method according to claim 1, wherein the preparing in the one or more sequential preparation steps comprises mixing and/or heating and/or comminuting.

10. A food processor for preparing a preparation item based on a recipe, the food processor comprising:
    an electric motor,
    a vessel designed to accommodate a mixer,
    a heater configured to heat the vessel,
    a data memory,
    a data communication device, and
    an evaluator and controller configured to evaluate behavior of a user of the food processor when the user uses the food processor and selects and/or executes a recipe, wherein the behavior of the user involves repeated deviations from recipe instructions, wherein the evaluator and controller is configured to store in the data memory a personal profile of the user based on the behavior of the user, the data memory containing a table for each of multiple users of the food processor, wherein the evaluator and controller is configured to evaluate the behavior of the user stored in the table by recognizing repetitions of the user behavior, wherein the data communication device is configured to receive information about a person, wherein the evaluator and controller is configured to control a current operating parameter of the food processor analogously to the operating parameters of the earlier preparations, wherein the food processor is configured to recognize whether the person is the user from the personal profile, wherein the evaluator and controller is configured to control operation of the food processor and is configured to control at least one of the following three operations:
heating the vessel via the heater,
rotating a stirrer of the food processor, or
maintaining the food processor, and wherein the evaluator and controller is configured to automatically control an operating parameter of at least one of the three operations of the food processor as a function of the personal profile stored in the data memory when the food processor recognizes the person as the user from the personal profile, and wherein the user behavior involves a switching of ingredients provided for a recipe for other ingredients and/or a quantity of an ingredient deviating from the recipe.

* * * * *